United States Patent
Bloom et al.

(10) Patent No.: US 9,036,243 B2
(45) Date of Patent: May 19, 2015

(54) DIGITAL DRIVE SIGNALS FOR ANALOG MEMS RIBBON ARRAYS

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 145 days.

(21) Appl. No.: 14/032,383

(22) Filed: Sep. 20, 2013

(65) Prior Publication Data
US 2014/0168750 A1 Jun. 19, 2014

Related U.S. Application Data

(60) Provisional application No. 61/705,000, filed on Sep. 24, 2012.

(51) Int. Cl.
| | |
|---|---|
| *G02B 26/00* | (2006.01) |
| *G02B 26/08* | (2006.01) |
| *G01C 3/08* | (2006.01) |
| *F21K 99/00* | (2010.01) |
| *H04N 13/02* | (2006.01) |
| *G02F 1/133* | (2006.01) |
| *G01B 11/25* | (2006.01) |

(Continued)

(52) U.S. Cl.
CPC ... *G01C 3/08* (2013.01); *F21K 9/58* (2013.01); *F21K 9/50* (2013.01); *H04N 13/0203* (2013.01); *G02F 1/155* (2013.01); *G09G 3/3433* (2013.01); *G02B 26/0808* (2013.01); *G02F 1/0128* (2013.01); *G09G 2300/0426* (2013.01); *G02B 27/0068* (2013.01); *G02B 26/0816* (2013.01); *G02B 26/085* (2013.01); *G09G 2300/0473* (2013.01); *G02B 26/0858* (2013.01); *G02F 1/29* (2013.01); *G02B 26/101* (2013.01); *G02F 1/0123* (2013.01); *G02B 26/06* (2013.01); *G02B 26/0833* (2013.01); *G02F 1/13306* (2013.01); *H04N 13/0253* (2013.01); *G01B 11/2527* (2013.01); *G02B 26/0841* (2013.01); *G06K 9/2036* (2013.01)

(58) Field of Classification Search
CPC ........... G02B 26/0833; G02B 26/0858; G02B 26/101; G02B 26/085; G02B 26/0841; G02B 26/0816; G02B 26/00; G02B 26/06; G02B 26/0808; G02B 27/0068; G09G 2300/0426; G09G 2300/0473; G09G 3/3433; G02F 1/29; G02F 1/0123; G02F 1/0128; G02F 1/155
USPC .......... 359/198.1, 199.2, 199.4, 200.6, 200.8, 359/201.2, 204.5, 221.2, 223.1, 279, 359/290–292, 298, 318
See application file for complete search history.

(56) References Cited

U.S. PATENT DOCUMENTS 5,311,360 A * 5/1994 Bloom et al. .................. 359/572
5,677,783 A * 10/1997 Bloom et al. .............. 359/224.1

(Continued)

OTHER PUBLICATIONS

Inose et al., "A Telemetering System by Code Modulation—Delta-Sigma Modulation", IRE Transactions on Space Electronics and Telemetry, Sep. 1962, p. 204-209.

(Continued)

*Primary Examiner* — Evelyn A Lester
(74) *Attorney, Agent, or Firm* — NUPAT, LLC; Morrison Ulman

(57) ABSTRACT

On/off digital drive signals are used to create arbitrary spatial and temporal ribbon movement patterns in MEMS ribbon arrays.

17 Claims, 10 Drawing Sheets

(51) Int. Cl.
| | |
|---|---|
| *G06K 9/20* | (2006.01) |
| *G02F 1/155* | (2006.01) |
| *G09G 3/34* | (2006.01) |
| *G02F 1/01* | (2006.01) |
| *G02B 27/00* | (2006.01) |
| *G02F 1/29* | (2006.01) |
| *G02B 26/10* | (2006.01) |
| *G02B 26/06* | (2006.01) |

(56) References Cited

U.S. PATENT DOCUMENTS

| | | | | |
|---|---|---|---|---|
| 5,706,061 | A | * | 1/1998 | Marshall et al. ............. 348/743 |
| 5,841,579 | A | * | 11/1998 | Bloom et al. ................. 359/572 |
| 6,144,481 | A | * | 11/2000 | Kowarz et al. ............... 359/291 |
| 6,147,789 | A | * | 11/2000 | Gelbart ......................... 359/231 |
| 6,215,579 | B1 | * | 4/2001 | Bloom et al. ................. 359/298 |
| 6,219,015 | B1 | * | 4/2001 | Bloom et al. ................... 345/87 |
| 6,741,384 | B1 | * | 5/2004 | Martin et al. ................. 359/291 |
| 6,856,449 | B2 | * | 2/2005 | Winkler et al. ............... 359/298 |
| 7,317,464 | B2 | * | 1/2008 | Willis ........................... 345/691 |
| 7,825,840 | B2 | | 11/2010 | Willig et al. |
| 2004/0207618 | A1 | * | 10/2004 | Williams et al. .............. 345/212 |
| 2005/0024722 | A1 | * | 2/2005 | Agostinelli et al. .......... 359/451 |
| 2006/0114544 | A1 | * | 6/2006 | Bloom et al. ................. 359/279 |
| 2009/0190197 | A1 | * | 7/2009 | Tinnemans et al. ........ 359/223.1 |

OTHER PUBLICATIONS

Rombach et al., "Modulated Electro-Mechanical Continuous-Time Lowpass Sigma-Delta-Modulator for Micromachined Gyroscopes", IEEE Transducers Jun. 2011, Beijing, China, p. 1092-1095.

\* cited by examiner

DIGITAL DRIVE SIGNALS FOR ANALOG MEMS RIBBON ARRAYS

RELATED APPLICATIONS

This application claims priority benefit from U.S. 61/705,000, "Structured light systems", filed on Sep. 24, 2012 and incorporated herein by reference.

TECHNICAL FIELD

The disclosure is related to micro-electromechanical (MEMS) ribbon arrays.

BACKGROUND

MEMS ribbon arrays may be operated as very fast analog optical phase modulators. Typical arrays can transition from one phase state to another in tens of nanoseconds. With appropriate light sources and optical phase discriminator systems, MEMS ribbon arrays may be used to project optical images.

MEMS ribbons' high speed enables linear (one-dimensional) arrays of ribbons to do the work of traditional spatial (two-dimensional) light modulators. Linear arrays create line images which may be scanned across a two-dimensional scene to 'paint' a two-dimensional image. Video frame rates of approximately 100 Hz to 1 kHz may be achieved in this way, fast enough to produce flicker-free video of complex visual scenes.

Linear arrays may also be used without scanning to create two-dimensional images, such as stripe patterns or bar codes, which vary along only one dimension. These simple images can be produced at frame rates as high as approximately 1 MHz or more. Depth capture systems based on observations of stripe patterns can take advantage of these high frame rates to enable advanced signal detection techniques.

FIG. 1 is a top view of part of a MEMS ribbon array 105. In FIG. 1, only 48 ribbons are shown (e.g. 110, 112, 114), but a typical array contains roughly a few hundred to roughly a few thousand ribbons. Coordinate axes are provided with FIG. 1 to facilitate comparison with FIGS. 2 and 3. Although ribbon dimensions may vary widely depending on particular applications, typical ribbons are roughly 100 to 300 microns long (y-direction), roughly 2 to 6 microns wide (x-direction), and roughly 0.1 to 0.3 microns thick (z-direction). Ribbons may be made from high-stress silicon nitride coated with aluminum or other materials to enhance optical reflectivity.

FIGS. 2A and 2B show a side view of a single MEMS ribbon at rest and under the influence of an applied voltage, respectively. In FIG. 2 ribbon 205 is supported by end-supports 210 over substrate 215. In FIG. 2A light ray 220 arrives at approximately normal incidence to ribbon 205 and is reflected as light ray 225. In FIG. 2A, ribbon 205 is at rest, not under the influence of external forces. In FIG. 2B, a voltage has been applied between ribbon 205 and substrate 215. The voltage pulls the ribbon from its rest position 230 toward the substrate by an amount, $\Delta z$, as shown in the figure. The optical phase, $\phi$, of a light ray reflected from a ribbon depends on the displacement, $\Delta z$, according to:

$$\phi - \phi_0 = 2\left(\frac{2\pi}{\lambda}\right)\Delta z.$$

Here $\phi_0$ is the phase of a ray reflected from the ribbon when it is in its rest position and $\lambda$ is the wavelength of light.

In conventional MEMS ribbon drivers, analog ribbon drive voltages are synthesized with high-precision digital-to-analog converters (DAC). A 12-bit DAC, for example, provides 4096 different drive voltage levels for a ribbon which leads to correspondingly fine control over the optical phase of light reflected from the ribbon.

When a MEMS ribbon array contains thousands of ribbons and each one is driven by its own precision DAC, the price and complexity of array drive electronics may become prohibitive. Furthermore precision DACs consume electrical power which is often in short supply in battery powered devices.

Therefore, what are needed are systems and methods for inducing analog MEMS ribbon movements from digital signals without using expensive, power-hungry, high-precision digital-to-analog converters.

DETAILED DESCRIPTION

Systems and methods are described below for using digital drive signals with analog MEMS ribbon arrays. These techniques take advantage of ribbons' mechanical frequency response characteristics. Digital drive techniques use one-bit, i.e. "on" or "off", signals to create: a) sinusoidal ribbon displacement near the ribbons' mechanical resonant frequency, or b) arbitrary ribbon displacement below the resonant frequency.

Sinusoidal Ribbon Displacement Near Resonance

MEMS ribbons are mechanical oscillators. Ribbon displacement, $\Delta z$, oscillates at the ribbon's resonant frequency if the ribbon is excited by an impulse. The resonant frequency depends on ribbon size, shape, material and tensile stress. Silicon nitride ribbons measuring about 200 by 5 by 0.1 microns resonate between about 2 and 5 MHz, for example.

Figure 3:
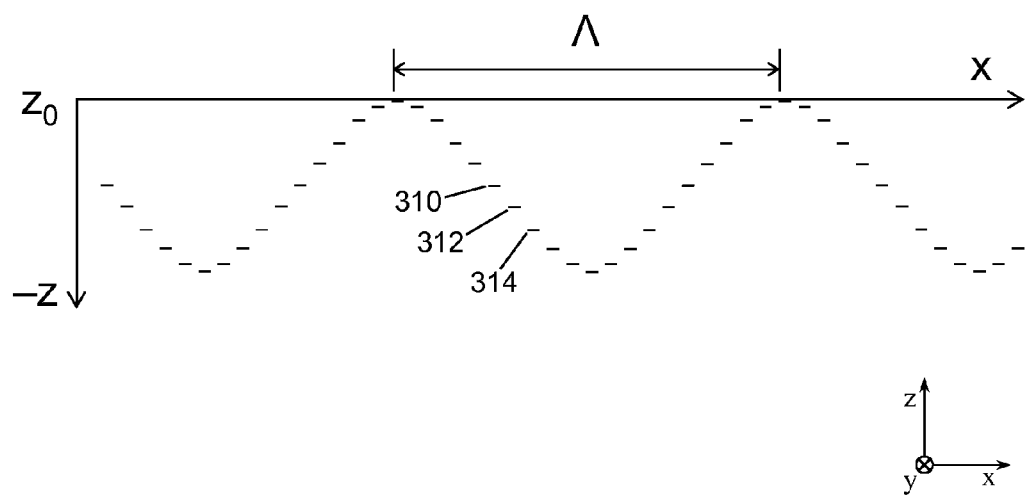
FIG. 3 is an example of desired ribbon displacements in an array at one instant in time.

A specific ribbon movement pattern is desired for certain structured light or depth capture applications: a) the displacement of each ribbon in a linear array varies sinusoidally in time; and, b) at any instant in time the displacement of ribbons varies sinusoidally along the array. This leads to travelling waves of ribbon displacement that move along the ribbon array. The same pattern may also be described as: each ribbon follows the same sinusoidal motion, but the movement of adjacent ribbons is phase shifted in time. FIG. 3 is an example of desired ribbon displacements in an array at one instant in time.

Figure 1:
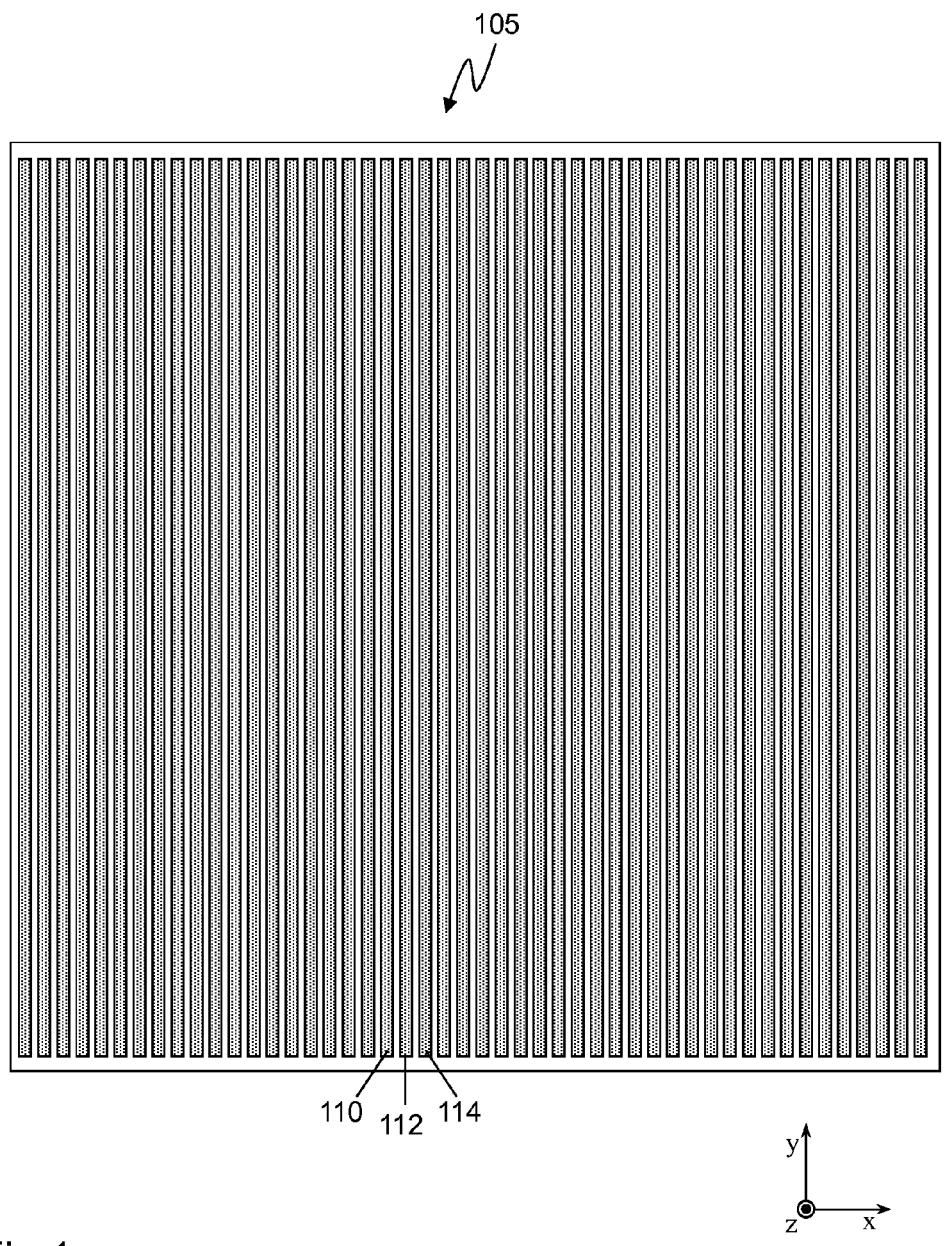
FIG. 1 is a top view of part of a MEMS ribbon array.
Figure 2:
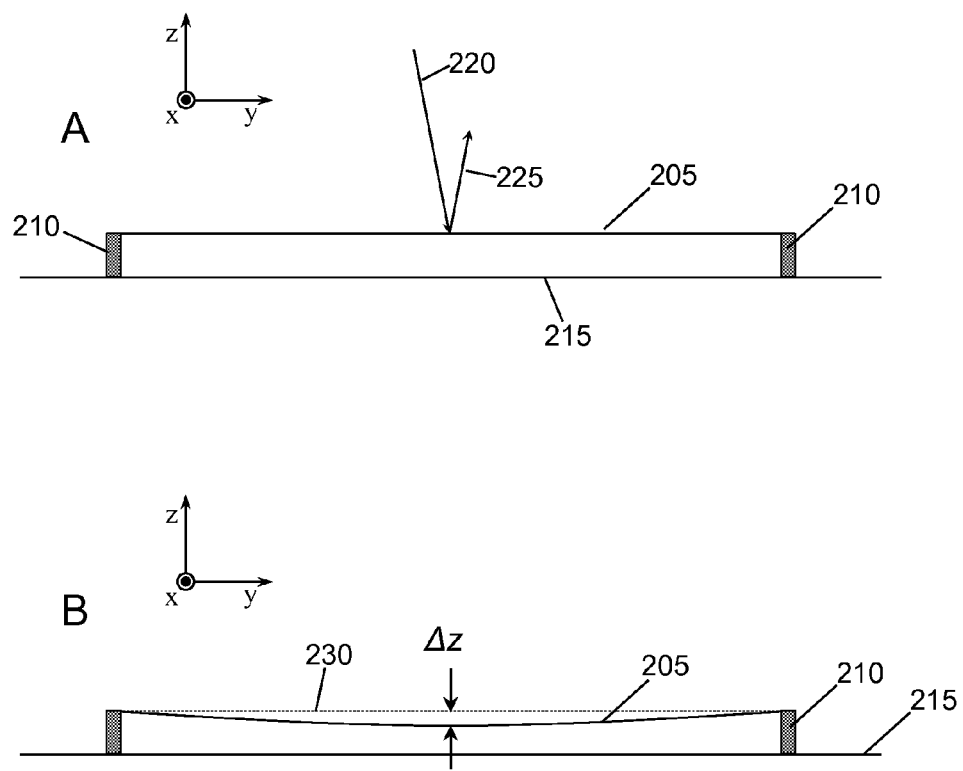
FIGS. 2A and 2B show a side view of a single MEMS ribbon at rest and under the influence of an applied voltage, respectively.

As in FIG. 1, FIG. 3 only shows 48 ribbons (e.g. 310, 312, 314), but a typical array contains roughly a few hundred to roughly a few thousand ribbons. Coordinate axes are provided to facilitate comparison of FIGS. 1, 2 and 3. The displacement pattern shown in FIG. 3 is sinusoidal along the array. Said another way the displacement of ribbons has the form sin (kn) where n is ribbon number from 1 to N, and N is the number of ribbons in the array.

$$k = \frac{2\pi}{\Lambda},$$

where $\Lambda$ is the wavelength (measured in number of ribbons) of the spatial ribbon displacement wave along the array. In time, the displacement of any particular ribbon in the array of FIG. 3 is proportional to sin ($\omega$t) where $\omega$ is a ribbon oscillation frequency and t is time.

The wave ribbon displacement pattern of FIG. 3 could be achieved by providing each ribbon with its own precision DAC and programming the DACs to produce sinusoidally varying output signals. However, there is a simpler way to achieve the same effect.

Displacement of a MEMS ribbon may be modeled as a driven, damped harmonic oscillator. Below the ribbon's mechanical resonant frequency, ribbon displacement follows a driving signal. Above the resonant frequency, the ribbon acts like a mechanical low-pass filter that attenuates high-frequency components of the driving signal. Hence, above resonance, a square-wave driving signal produces sine wave ribbon movement.

The amplitude of ribbon displacement at frequencies near resonance depends on mechanical damping. Damping characteristics of MEMS ribbons can be designed by selecting the rest height of the ribbon over the substrate to control squeeze film air damping. Ribbon arrays that are designed with low damping exhibit higher amplitude oscillatory motion near resonance than those having high damping.

Figure 4:
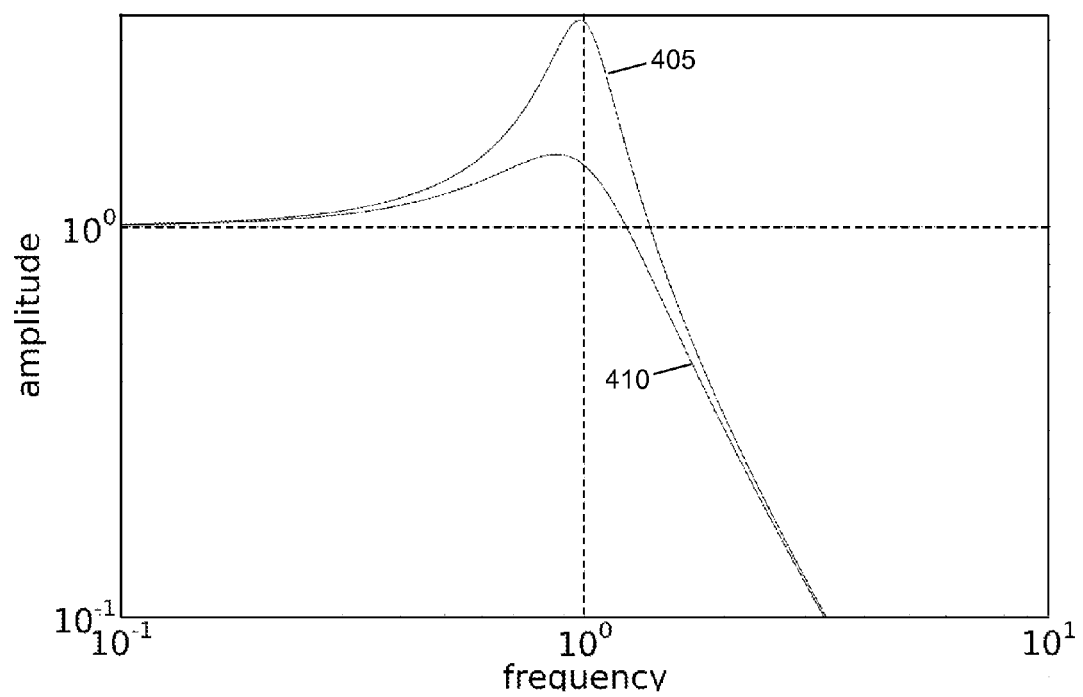
FIG. 4 is a graph of ribbon mechanical frequency response for high and low damping.

FIG. 4 is a graph of ribbon mechanical frequency response for high and low damping. In FIG. 4 ribbon amplitude is plotted versus driving frequency. Both amplitude and frequency are plotted in normalized units and frequency varies from 0.1 to 10 times the resonant frequency which is 1 cycle per unit time. Curve 405 corresponds to low damping while curve 410 corresponds to high damping. In both cases the amplitude at roughly 3 times the resonant frequency is roughly 0.1 times (i.e. 10 dB lower than) the amplitude at low frequency.

Figure 5:
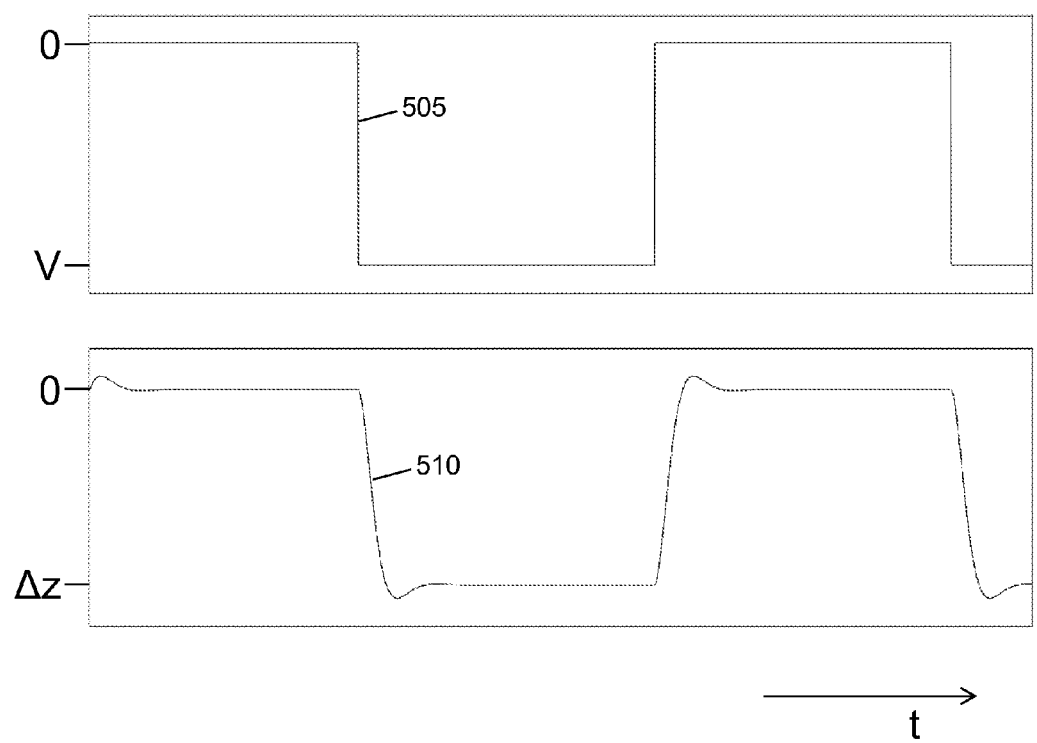
FIG. 5 shows a low-frequency square-wave ribbon driving function and response.

FIG. 5 shows a low-frequency square-wave ribbon driving function and response. In FIG. 5, plot 505 is a square wave driving function. It may be interpreted as a voltage applied between a ribbon and an underlying substrate; the voltage pulls the ribbon toward the substrate regardless of sign. Plot 510 shows ribbon position. When the driving voltage changes from zero to V, the ribbon is deflected by $\Delta z$ from its rest position.

The fundamental frequency or repetition rate of square wave driving function 505 is lower than the ribbon resonant frequency. Hence, ribbon movement follows the driving function.

Figure 6:
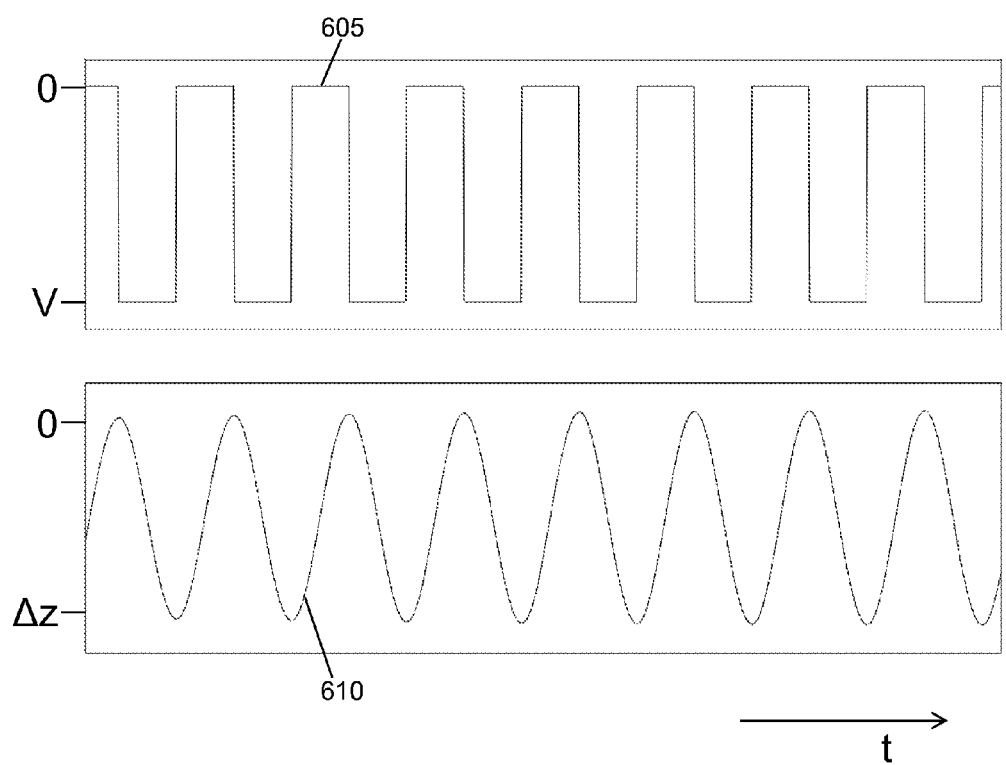
FIG. 6 shows a high-frequency square-wave ribbon driving function and response.

FIG. 6 shows a high-frequency square-wave ribbon driving function and response. In FIG. 6, plot 605 is a square wave driving function. It may be interpreted as a voltage applied between a ribbon and an underlying substrate; the voltage pulls the ribbon toward the substrate regardless of sign. Plot 610 shows ribbon position; the ribbon does not follow the driving function. Rather, the ribbon movement is sinusoidal.

Ribbon motion plot 610 may be understood by considering the ribbon frequency response curves shown in FIG. 4. A square wave driving signal such as 605 is composed of a fundamental sinusoid, a third harmonic, a fifth harmonic, etc. If the harmonics are attenuated by the mechanical low-pass filter characteristics of the ribbon, the fundamental sinusoid is left as the dominant motion.

Figure 7:
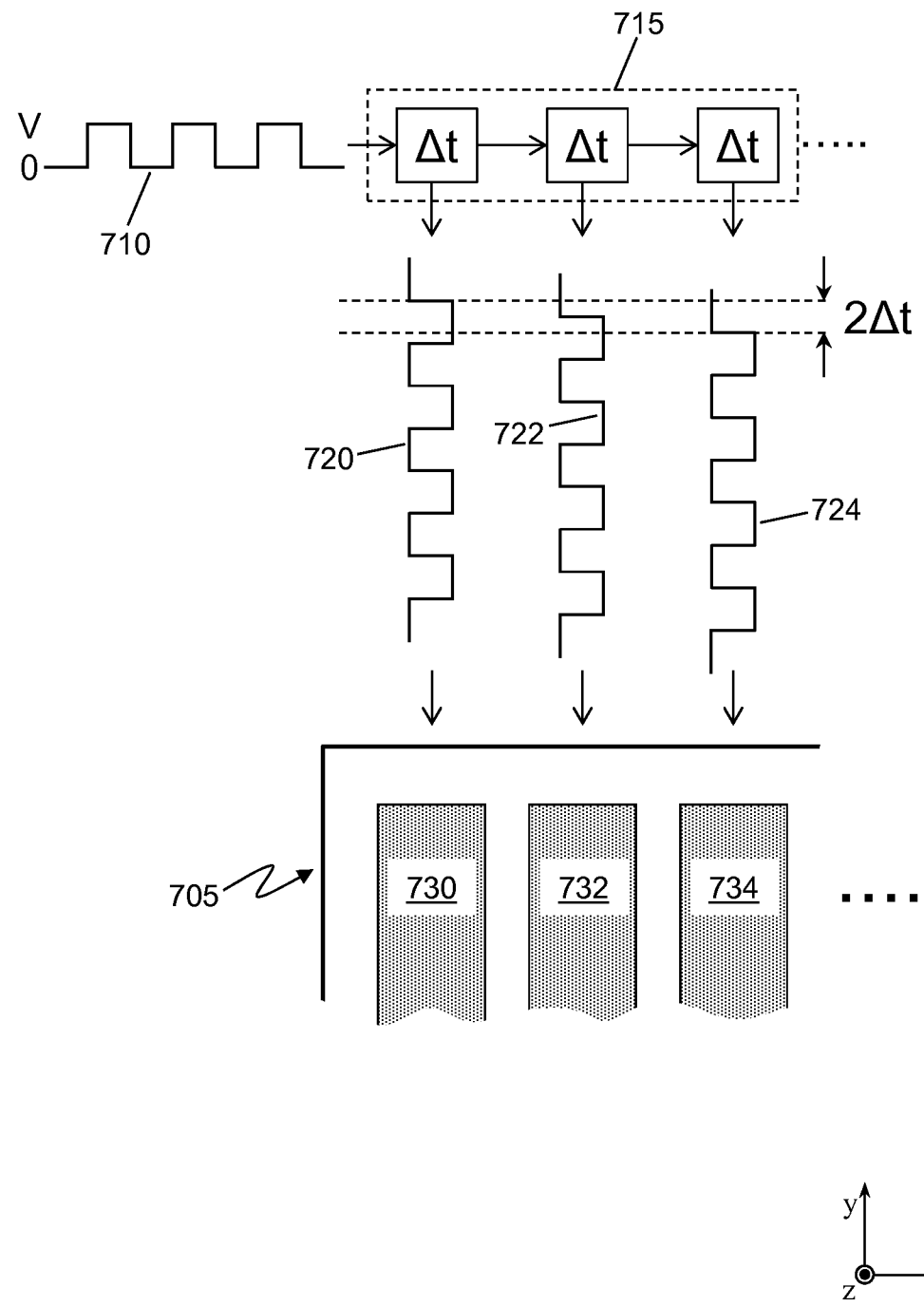
FIG. 7 is a conceptual diagram of a system for generating phase-delayed ribbon drive signals.

Square-wave driving signals may be produced with simple electronic circuits thus eliminating the need for precision DACs. Sine wave ribbon displacement may be produced by a high frequency square wave driving signal when its harmonics are attenuated by mechanical low-pass filter characteristics of the ribbon. Sine wave, but phase shifted, ribbon displacement for an adjacent ribbon in an array may be produced by phase-delaying a square wave driving signal before it is applied to the adjacent ribbon. FIG. 7 is a conceptual diagram of a system for generating phase-delayed ribbon drive signals. This scheme may be used to produce travelling waves of ribbon displacement that move along a ribbon array.

FIG. 7 shows just a small part of ribbon array 705. Ribbons in the array are driven by a square wave electrical driving signal 710. The square wave has just two voltage levels: zero and V. Square wave 710 is applied to delay circuit 715. The purpose of the delay circuit is to produce delayed copies of square wave 710. In FIG. 7, delay circuit produces square waves 720, 722 and 724 from square wave 710. Square wave 722 is delayed from square wave 720 by a delay time $\Delta t$. Similarly, square wave 724 is delayed from square wave 722 by $\Delta t$. Delay circuit 715 may be configured to provide many more outputs; it may have one output for each ribbon in a ribbon array, for example. The delay circuit may be implemented with serial-in, parallel-out shift registers, or field programmable gate arrays, or other digital circuits.

Square waves 720, 722 and 724 drive ribbons 730, 732, 734, respectively. If the square waves' third and higher harmonics are higher in frequency than the ribbons' mechanical resonant frequency, then the ribbons' displacement will be sinusoidal as discussed in connection with FIG. 6. The delays or phase shifts between square waves for adjacent ribbons lead to corresponding phase shifts in the sinusoidal ribbon motion. This leads to a travelling wave of displacement along the ribbon array and a sinusoidal spatial displacement pattern at any instant in time as discussed in connection with FIG. 3.

In the example of FIG. 7, signals are applied to adjacent ribbons. However, in some applications only every other ribbon of a ribbon array is driven. In that case, phase delayed signals would be applied to adjacent active (as opposed to stationary) ribbons, or every other actual ribbon.

Ribbon array movement patterns that are sinusoidal in both time and space may be produced from digital "on"/"off" signals. These movement patterns are useful in certain structured light and depth capture scenarios where a ribbon array is part of a projector that produces two dimensional images that vary in only one dimension. However, the techniques described above are limited to frequencies near the mechanical resonant frequency of a ribbon which may be a few MHz. Hence techniques for producing arbitrary ribbon displacements, including sinusoids, at frequencies below the ribbon resonant frequency are described next.

Arbitrary Ribbon Displacement Below Resonance

When the duration of a driving pulse, e.g. an electrical pulse, is less than the reciprocal of a ribbon's resonant frequency, the ribbon cannot follow the shape of the pulse, but its displacement is proportional to the energy in the pulse. A series of short drive pulses causes a DC ribbon displacement.

This effect may be used to obtain low-frequency ribbon control via pulse density modulation with high frequency pulses. The appropriate pulse density modulation signal may be produced with a Σ-Δ (sigma-delta) modulator.

Figure 8:
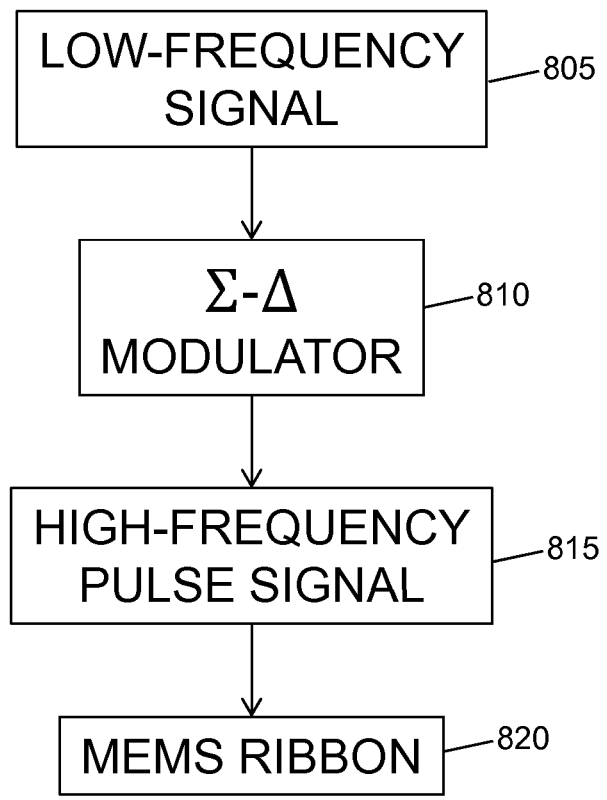
FIG. 8 is a system block diagram for a pulse-density-modulation ribbon-drive system.

FIG. 8 is a system block diagram for a pulse-density-modulation ribbon-drive system. In FIG. 8 a desired low-frequency signal 805 is input to Σ-Δ modulator 810. The Σ-Δ modulator generates a high-frequency pulse signal 815 that is applied to MEMS ribbon 820. The mechanical low-pass filter characteristics of the ribbon result in ribbon motion that follows low-frequency signal 805.

Consider, as an example, a 1 kHz sine wave as low-frequency signal 805 and a MEMS ribbon 820 with a 1 MHz resonant frequency. Σ-Δ modulator 810 produces a pulse density modulation signal, i.e. a series of short electrical pulses, that, when applied to ribbon 820, cause a 1 kHz sinusoidal ribbon displacement.

Figure 9:
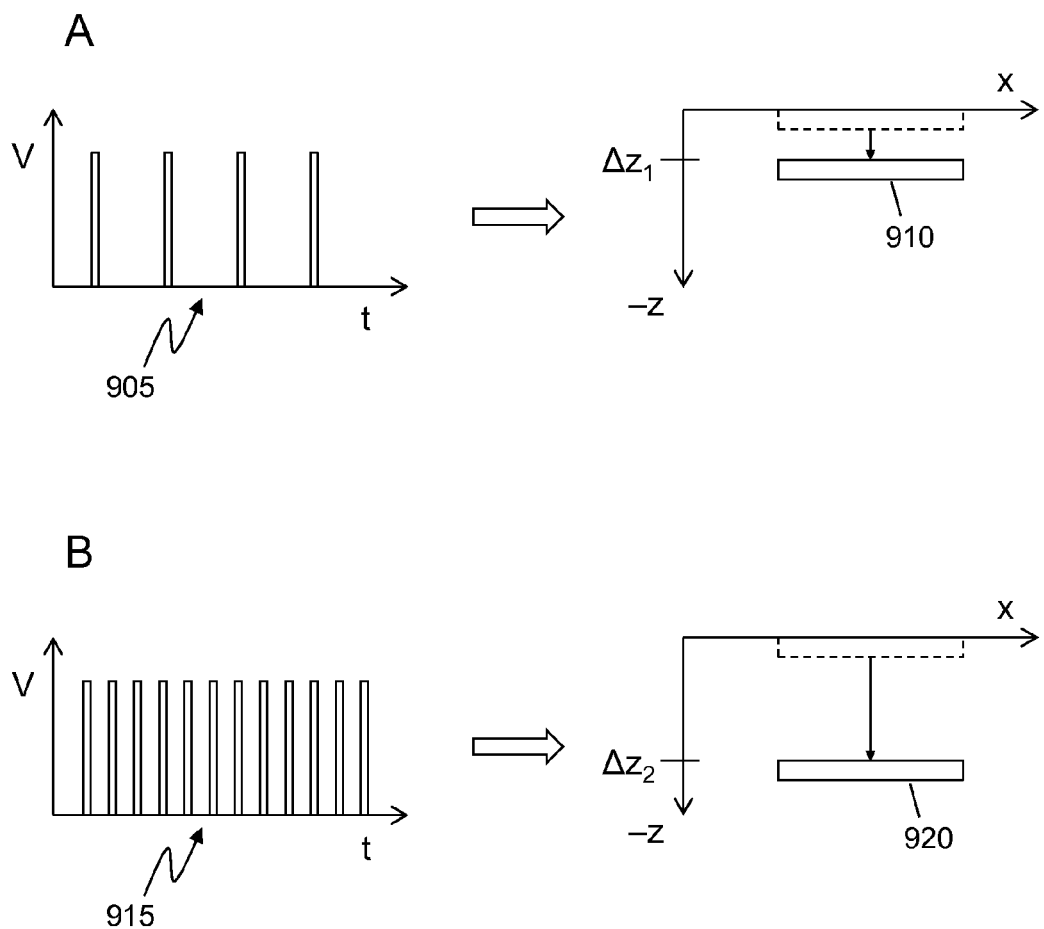
FIGS. 9A and 9B illustrate ribbon displacement versus pulse density.

FIGS. 9A and 9B illustrate ribbon displacement versus pulse density. In FIG. 9A a low density pulse train 905 causes a displacement $\Delta z_1$ of MEMS ribbon 910. In FIG. 9B a high density pulse train 915 causes a similar MEMS ribbon 920 to be displaced by $\Delta z_2$ where $\Delta z_2 > \Delta z_1$.

Figure 10:
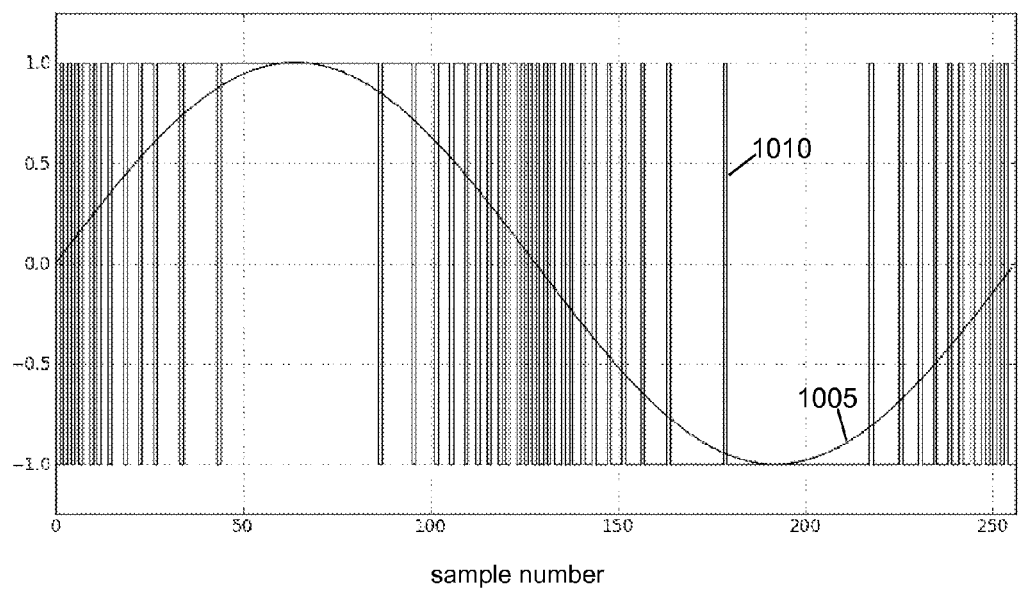
FIG. 10 shows input and output waveforms of a $\Sigma$-$\Delta$ modulator.

FIG. 10 shows input and output waveforms of a Σ-Δ modulator. In FIG. 10, sine curve 1005 represents a low frequency input signal to a Σ-Δ modulator while pulse waveform 1010 represents the output signal. The input is said to be oversampled by a factor of 256 since there are 256 pulses used to represent one cycle of the input. Note that when consecutive output pulses have the same sign, they are concatenated to a longer pulse. Thus the series of positive pulses around samples 50 to 75 are part of one longer positive pulse.

The Σ-Δ output signal has only two states, +1 and −1. When these states are used to drive a MEMS ribbon, the corresponding voltages are V and 0 since a ribbon has the same response to positive and negative applied voltages.

Σ-Δ modulation may be combined with a delay scheme as shown in FIG. 7 if the simple square wave input 710 is replaced by the output of a Σ-Δ modulator. In this way a wide variety of spatial and temporal ribbon movement patterns may be produced in a ribbon array using only two-state (e.g. V and 0) digital signals.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for driving an array of MEMS ribbons comprising:
   providing a linear array of MEMS ribbons, each ribbon having a mechanical resonant frequency and characterized by a mechanical low-pass frequency response;
   creating a square wave voltage signal characterized by a fundamental frequency and odd (first, third, fifth, . . . ) harmonics;
   applying the square wave voltage signal to a first ribbon of the array;
   delaying the square wave voltage signal by a phase delay; and,
   applying the phase-delayed square wave voltage signal to a second ribbon of the array.

2. The method of claim 1, the first and second ribbons executing sinusoidal motion in response to the square wave voltage signal.

3. The method of claim 1, the third harmonic of the square wave voltage signal being attenuated by 10 dB or more with respect to the fundamental frequency by the mechanical low-pass frequency response.

4. The method of claim 1, applying additional phase-delayed copies of the square wave signal to additional ribbons of the array, each successive copy phase-delayed by a successively greater amount.

5. The method of claim 1, ribbons of the array executing a traveling wave displacement pattern.

6. The method of claim 1, the delaying implemented with a shift register.

7. A method for driving an array of MEMS ribbons comprising:
   providing a linear array of MEMS ribbons, each ribbon having a mechanical resonant frequency and characterized by a mechanical low-pass frequency response;
   creating a first driving signal having a characteristic frequency lower than the mechanical resonant frequency;
   applying the first driving signal to a first Σ-Δ modulator to create a first pulse density modulated voltage signal; and,
   applying the pulse density modulated voltage signal to a first ribbon of the array.

8. The method of claim 7 further comprising:
   delaying the pulse density modulated voltage signal by a phase delay; and,
   applying the phase-delayed pulse density modulated voltage signal to a second ribbon of the array.

9. The method of claim 7 further comprising:
   creating a second driving signal having a characteristic frequency lower than the mechanical resonant frequency;
   applying the second driving signal to a second Σ-Δ modulator to create a second pulse density modulated voltage signal; and,
   applying the second pulse density modulated voltage signal to a second ribbon of the array.

10. A system comprising:
    a linear array of MEMS ribbons, each ribbon having a mechanical resonant frequency and characterized by a mechanical low-pass frequency response;
    a signal generator that creates a square wave voltage signal characterized by a fundamental frequency and odd (first, third, fifth, . . . ) harmonics, the square wave voltage signal applied to a first ribbon of the array; and,
    a delay circuit that delays the square wave voltage signal by a phase delay, the phase-delayed square wave voltage signal applied to a second ribbon of the array.

11. The system of claim 10, the first and second ribbons executing sinusoidal motion in response to the square wave voltage signal.

12. The system of claim 10, the third harmonic of the square wave voltage signal being attenuated by 10 dB or more with respect to the fundamental frequency by the mechanical low-pass frequency response.

13. The system of claim 10, the delay circuit comprising a shift register.

14. A system comprising:
    a linear array of MEMS ribbons, each ribbon having a mechanical resonant frequency and characterized by a mechanical low-pass frequency response;

a first signal generator that creates a first driving signal having a characteristic frequency lower than the mechanical resonant frequency; and, a first Σ-Δ modulator that creates a first pulse density modulated voltage signal corresponding to the first driving signal, the first pulse density modulated voltage signal being applied to a first ribbon of the array.

15. The system of claim 14 further comprising:

a delay circuit that delays the first pulse density modulated voltage signal by a phase delay, the phase-delayed pulse density modulated voltage signal applied to a second ribbon of the array.

16. The system of claim 15, the delay circuit comprising a shift register.

17. The system of claim 14 further comprising:

a second signal generator that creates a second driving signal having a characteristic frequency lower than the mechanical resonant frequency; and, a second Σ-Δ modulator that creates a second pulse density modulated voltage signal corresponding to the second driving signal, the second pulse density modulated voltage signal being applied to a second ribbon of the array.

* * * * *